United States Patent Office 3,463,750
Patented Aug. 26, 1969

3,463,750
WATER-THINNABLE, AIR-DRYING FILM-FORMING POLYESTER RESIN COMPOSITIONS
Arthur G. Ghosh, Perstorp, Sweden, assignor to Perstorp AB, Perstorp, Sweden
No Drawing. Filed May 2, 1966, Ser. No. 546,536
Claims priority, application Sweden, May 10, 1965, 6,043/65
Int. Cl. C08g 39/00
U.S. Cl. 260—22                                12 Claims

ABSTRACT OF THE DISCLOSURE

Film-forming polyester resin compositions are prepared by reacting a mixture of (A) a polyhydric aromatic acid having at least three reactive carboxy groups or the anhydride thereof,
(B) an allyl ether of a polyhydric alcohol having at least three hydroxyls, one of which is not etherified,
(C) an aliphatic or aromatic dibasic acid, and
(D) an alcohol having at least two free hydroxyl groups.

The ratio of acidic to hydroxyl radicals in the starting mixture shall be 1:1–1:15, and the reaction is carried out to an acid number below 70, preferably 50–52, followed by neutralization with ammonia.

The product is air-dried, may be thinned with water or hydrocarbon solvents, and forms a hard, flexible transparent non-yellowing film.

Field of the invention

The present invention relates to polyester mixtures, which can be thinned with water or hydrocarbons and which can be air dried or oven baked at elevated temperatures to hard, flexible, insoluble films with or without any addition of other reactive or compatible materials.

Background of the invention

Alkyds can usually be divided in two main groups:

(1) Alkyds which are modified by the addition of oils or fatty acids, which have a substantial degree of unsaturation in the chain. These alkyds can be dried to useful films usually by autoxidation at room temperature.

(2) Alkyds which are modified by substantially saturated oils or fatty acids and which form films at high temperatures by reaction with other material such as the reaction products of urea or melamine with formaldehyde etc.

The alkyds in group 1 are characterized by the degree and the kind of unsaturation, on which the drying and the yellowing properties of the film are dependent.

Oil free polyesters, however, which are dependent on peroxides or the like for the polymerization and forming of useful films must always be protected against the air, if films are to be obtained within reasonable period of time.

The solubility properties of the alkyds, which are important for the ultimate application are determined by the type and the content of the modifying oil. Water thinnable or water reducible alkyds manufactured according to the known techniques are formed by reaction between unesterified carboxyl groups of the polybasic or other acids in the alkyd with amines or ammonia and they are thereafter thinned with water combined with reasonable amount of solvent containing oxygen. The polymer thus obtained has the disadvantage that the evaporation of the amine is obstructed during the film formation, which gives rise to an undesirable coloration especially when oils having a high degree of unsaturation are used.

There exists accordingingly a demand for a material, which forms nonyellowing films, which can be autoxidized, crosslinked at high temperatures, which is compatible with other filmforming or modifying materials and which has a variable solubility.

Summary of the invention

According to the invention these demands are satisfied by polyester mixtures containing a reaction product of three- or polybasic, aromatic acids or anhydrides, allyl ethers of three- or polyhydric alcohols, aromatic or aliphatic, dibasic acids or anhydrides, alcohols having two or more free hydroxyl groups, preferably in a primer position and optionally acyclic monoacyl radicals, preferably having 8–18 carbon atoms.

The three- or polybasic acids, which can be used, are preferably trimellitic acid (benzene-1,2,4-tricarbon acid), hemimellitic acid (benzene-1,2,3-tricarbon acid), trimesic acid (benzene-1,3,5-tricarbon acid), pyromellitic acid (benzene - 1,2,4,5 - tetracarbon acid), mellophanic acid (benzene-1,2,3,4-tetracarbon acid) prehnitic acid (benzene-1,2,3,5-tetracarbon acid) or mixtures thereof. Preferably at least 40 percent of the acid groups in the starting materials derive from such polybasic acids.

Among allyl ethers mono- or diallyl ethers of trimethylolpropane or allyl ethers of pentaerythritol or sorbitol having at least one free hydroxyl group are preferred. Mixtures of these may be used and also mixtures of them together with other ally ethers.

The dibasic acids are those usually employed in alkyds such as phthalic acid, maleic acid, fumaric acid, isophthalic acid, terephthalic acid, adipic acid, mixtures thereof or the like.

As alcohols having two or more free hydroxyl groups preferably trimethylolpropane, pentaerythritol, sorbitol or mixtures thereof are used.

The ratio between the acid radicals and the hydroxyl radicals in the mixtures should correspond to chemical equivalence or an excess of hydroxyl radicals of up to 15 percent.

As mentioned above acyclic monoacyl radicals having preferably 8–18 carbon atoms may be added for better control of the flexibility. These radicals derive preferably from pelargonic acid or coconut oil. Due to the allyl groups the amount of these radicals may be lowered to 10 percent by weight or below still maintaining the ability of being water thinnable and the other valuable properties.

The esters are produced by reacting the starting materials in an inert atmosphere such as carbon dioxide or nitrogen gas at a temperature of 140–220° C., the heating being preferably performed stepwise until an acid number (mg. KOH per g. resin) of down to 70, preferably 50–52, is attained. The mixture is thereafter neutralized for example with an amine, preferably a tertiary amine or ammonia and then dried with water containing the required amount of solvent having an oxygen content such as tertiary butyl alcohol. If the reaction is allowed to proceed to an acid number below 50, the product could be solved in a hydrocarbon such as xylene, white spirits or mixtures of similar solvents.

A preferred process for the production is first heating the reaction mixture during 2–3 hours to 140–180° C. and maintaining this temperature in about 3 hours and thereafter raising it to approx. 200–220° C., maintaining it there until the acid number has declined to a suitable value.

7. Process for the production of polyester compositions according to claim 1, in which the reaction composition has an acid value above 70 and is heated in an inert atmosphere at a temperature of 140–220° C. until the acid number is reduced to a value below 70, the mixture is cooled quickly and thereafter neutralized with ammonia or an amine.

8. Process according to claim 7, in which the composition is heated in a first step during 2–3 hours to 140–180° C. and maintained at this temperature up to 3 hours, whereupon the temperature is raised to approximately 200–220° C. and maintained there until the acid number has declined to the said value.

9. Process according to claim 7, in which xylene or a mixture of xylene and methylisobutylketone is added to the composition during the heating to form a mixture azeotropic with water.

10. Process for the production of polyester compositions according to claim 4, in which the reaction composition is heated in an inert atmosphere at a temperature of 140–220° C. until the acid number is reduced to a value below 70, the mixture is cooled quickly and thereafter neutralized with ammonia or an amine.

11. Process according to claim 10, in which the composition is heated in a first step during 2–3 hours to 140–180° C. and maintained at this temperature up to 3 hours, whereupon the temperature is raised to approximately 200–220° C. and maintained there until the acid number has declined to the said value.

12. Process according to claim 11, in which xylene or a mixture of xylene and methylisobutylketone is added to the composition during the heating to form a mixture azeotropic with water.

References Cited
UNITED STATES PATENTS

| | | | |
|---|---|---|---|
| 2,852,487 | 9/1958 | Maker | 260—861 |
| 2,856,374 | 10/1958 | Bolton | 260—22 |
| 2,885,375 | 5/1959 | Campbell | 260—22 |
| 2,954,354 | 9/1960 | Young | 260—22 |
| 3,196,119 | 7/1965 | Boller et al. | 260—22 |
| 3,197,439 | 7/1965 | Frey | 260—75 |
| 3,068,206 | 12/1962 | Nicholson et al. | 260—22 |
| 3,355,408 | 11/1967 | Mayer et al. | 260—75 |
| 3,390,135 | 6/1968 | Seiner | 260—22 |

DONALD E. CZAJA, Primary Examiner

R. W. GRIFFIN, Assistant Examiner

U.S. Cl. X.R.

117—124, 132, 161, 167; 260—20, 21, 23, 29.2, 29.3, 29.4, 29.6, 32.4, 32.6, 32.8, 33.4, 33.6, 75, 77

PO-1050
(5/69)

UNITED STATES PATENT OFFICE
CERTIFICATE OF CORRECTION

Patent No. 3,463,750                    Dated August 26, 1969

Inventor(s)   Arthur G. Ghosh

It is certified that error appears in the above-identified patent and that said Letters Patent are hereby corrected as shown below:

1. In the Abstract, column 1, line 25, "1:1-1:15" should be -- 1:1-1.15 --.

2. Column 2, line 33, "ally" should be -- allyl --.

3. Column 3, line 56 (in Example 3) "10 parts" should be -- 100 parts --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents